US008209081B2

(12) United States Patent
Joyce

(10) Patent No.: US 8,209,081 B2
(45) Date of Patent: Jun. 26, 2012

(54) MINIMIZING WHEEL SPEED AND ACCELERATION ERRORS

(75) Inventor: John Patrick Joyce, West Bloomfield, MI (US)

(73) Assignee: Ford Global Technologies, Dearborn, MI (US)

( * ) Notice: Subject to any disclaimer, the term of this patent is extended or adjusted under 35 U.S.C. 154(b) by 656 days.

(21) Appl. No.: 12/405,426

(22) Filed: Mar. 17, 2009

(65) Prior Publication Data

US 2009/0306851 A1  Dec. 10, 2009

Related U.S. Application Data

(60) Provisional application No. 61/060,104, filed on Jun. 9, 2008.

(51) Int. Cl.
G01P 3/481 (2006.01)
G01P 21/00 (2006.01)

(52) U.S. Cl. ........ 701/33.1; 701/30.2; 701/30.4; 701/31.2; 701/34.1; 73/506; 702/96; 702/148

(58) Field of Classification Search ............ None
See application file for complete search history.

(56) References Cited

U.S. PATENT DOCUMENTS

| 5,099,443 | A | * | 3/1992 | Higashimata et al. | 702/141 |
|---|---|---|---|---|---|
| 5,299,131 | A | * | 3/1994 | Haas et al. | 701/92 |
| 5,479,811 | A | * | 1/1996 | Baumann et al. | 73/1.37 |
| 5,490,070 | A | * | 2/1996 | Kiryu et al. | 701/70 |
| 5,541,859 | A | * | 7/1996 | Inoue et al. | 702/148 |
| 5,642,280 | A | * | 6/1997 | Negrin et al. | 701/1 |
| 5,729,476 | A | * | 3/1998 | Pfau | 702/185 |
| 5,929,329 | A | * | 7/1999 | Burkhard et al. | 73/146 |
| 6,014,599 | A | * | 1/2000 | Inoue et al. | 701/29 |
| 6,446,018 | B1 | * | 9/2002 | Isermann et al. | 702/96 |
| 6,813,583 | B2 | * | 11/2004 | Kumar et al. | 702/148 |
| 6,959,234 | B2 | * | 10/2005 | Vos et al. | 701/29 |

FOREIGN PATENT DOCUMENTS

JP  63172966  *  7/1988

OTHER PUBLICATIONS

Schwarz et al., Increasing Signal Accuracy of Automotive Wheel-Speed Sensors by Online Learning, Jun. 1997, Proceedings of the 1997 American Control Conference, vol. 2, pp. 1131-1135.*

* cited by examiner

Primary Examiner — Thomas G. Black
Assistant Examiner — Lindsay M Browder
(74) Attorney, Agent, or Firm — Angela M. Brunetti

(57) ABSTRACT

A method for compensating for wheel speed and acceleration calculation errors comprising the steps of collecting a wheel speed signal, creating at least one compensation factor for the wheel speed signal, correlating each compensation factor with a rotational position of the wheel, modifying each compensation factor individually based on variations in calculations made from the information collected according to the rotational position of the wheel, and calculating wheel speed and acceleration using the at least one compensation factor applied according to the rotational position of the wheel from which the wheel speed signal is collected.

12 Claims, 1 Drawing Sheet

US 8,209,081 B2

MINIMIZING WHEEL SPEED AND ACCELERATION ERRORS

CROSS REFERENCE TO RELATED APPLICATIONS

This application claims the benefit of the filing date of U.S. Provisional Patent Application Ser. No. 61/060,104, filed Jun. 9, 2008, entitled "Minimizing Wheel Speed and Acceleration Errors", the entire disclosure of which is hereby incorporated by reference into the present application.

TECHNICAL FIELD

The inventive subject matter generally relates to wheel speed and acceleration calculations and more particularly to minimizing errors in wheel speed and acceleration calculations.

BACKGROUND

Wheel speed calculations are necessary to vehicle dynamic control systems, such as brake control strategies exemplified by antilock brake control, traction control and stability control. The performance of many of these control methods is significantly improved by precise wheel speed calculations. For example, methods that are enhanced by fast response to wheel speed signal accelerations are sensitive to small errors in the wheel speed calculation, and require highly accurate, precise wheel speed calculations.

Wheel acceleration calculations are typically made by taking two wheel speed calculations and dividing by the time interval between the wheel speed calculations. As the time interval is reduced for fast response, small errors in the wheel speed value have an even larger affect on the acceleration calculation.

A significant source of error in the wheel speed calculation is variation in the wheel-speed tone ring or magnetized encoder that modulates the magnetic field used to calculate wheel speed. A typical wheel speed sensor has teeth on a tone-ring, providing a number of magnetic field changes per rotation of the wheel. However, slight variations in manufacturing tolerances for the teeth, broken or missing teeth, imperfections in a tire, or deformation of the tone-ring when high-loads are present on the vehicle may result in different amounts of rotation relating to errors in wheel speed calculations. As described above, small differences in wheel speed signals are significant in the calculations of wheel speed and acceleration.

There is a need to minimize wheel speed and acceleration errors in order to maximize the performance of dynamic control systems on a vehicle, particularly antilock brake control.

SUMMARY

A method for compensating for wheel speed and acceleration calculation errors that comprises collecting wheel speed signals, creating at least one compensation factor for each collected wheel speed signal, correlating each compensation factor with a rotational position of the wheel, modifying each compensation factor individually based on variations in calculations made from the information calculated according to the rotational position of the wheel, and calculating wheel speed and acceleration using the compensation factor applied according to the rotational position of the wheel from which the wheel speed signal is collected. The method comprises the combination of features of the independent claims, preferred optional features being introduced by the dependent claims.

Elements and steps in the figures are illustrated for simplicity and clarity and have not necessarily been rendered according to any particular sequence. For example, steps that may be performed concurrently or in different order are illustrated in the figures to help to improve understanding of the embodiments of the inventive subject matter.

DESCRIPTION OF INVENTION

While various aspects of the present invention are described with reference to a particular illustrative embodiment, the invention is not limited to such embodiments, and additional modifications, applications, and embodiments may be implemented without departing from the inventive subject matter. In the figures, like reference numbers will be used to illustrate the same components. Those skilled in the art will recognize that the various components set forth herein may be altered without varying from the scope of the inventive subject matter.

Figure 1:
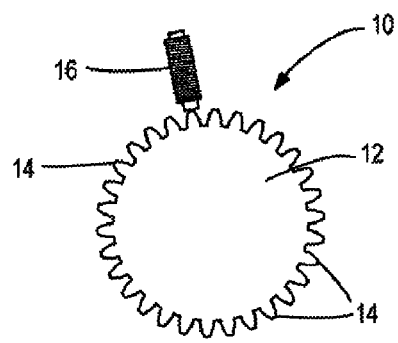
FIG. 1 is an example of a wheel speed sensor.

FIG. 1 is an example of a typical wheel speed sensor 10. A sensing wheel 12, which generally has a plurality of teeth 14, is rotatably attached to a motor shaft of a motor (not shown). The sensing wheel 12 rotates with the rotation of the shaft of the motor and causes a change in a magnetic flux pattern created by a permanent magnet (also not shown). In some sensors, the changing flux pattern induces a voltage in a sensing coil 16 providing a sensing coil output signal indicative of the position and rotational speed of the shaft. Other sensors, such as Hall Effect and magneto-resistive technologies, monitor magnetic flux, but do so without a coil. As described in the background, slight variations in manufacturing tolerances for the teeth, broken or missing teeth, as well as imperfections in a tire, and forces on the vehicle may result in different amounts of rotation relating to errors in wheel speed calculations. As the time interval for fast response is reduced, small errors in the wheel speed value have larger affects in the acceleration calculation, resulting in a significant source of error in the wheel speed calculations.

Figure 2:
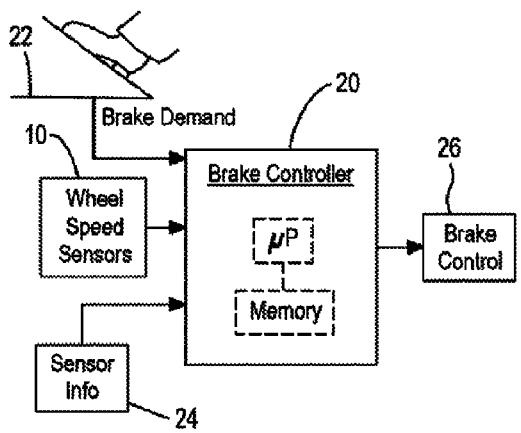
FIG. 2 is an example of brake control system.

Referring to FIG. 2 there is shown an example of a brake system 18 that may employ the inventive subject matter. A plurality of wheel speed sensors 10 are used by a brake controller 20, along with other signals such as brake demand from a brake pedal 22 and other sensors 24, such as, for example, a signal from other sensors 24, including but not limited to yaw rate sensor, lateral accelerometer and others, not specifically shown in FIG. 2. The brake controller 20 generates a brake control signal 26, which may include wheel speed and acceleration calculations based on signals from the wheel speed sensors 10. According to the inventive subject matter, a compensation factor, C, for each wheel speed signal is created and correlated with the rotational position of the tire/wheel assembly.

Figure 3:
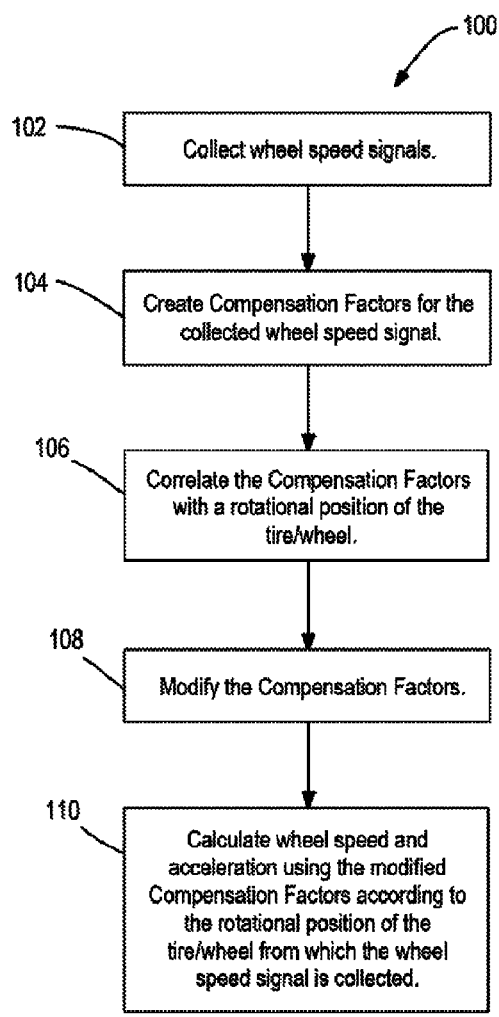
FIG. 3 is a block diagram of the method of the inventive subject matter.

Referring to FIG. 3, a block diagram of the inventive subject matter is presented in which a method 100 for compensating for wheel speed and acceleration calculation errors is implemented in the brake controller. The method 100 collects wheel speed signals 102 from the plurality of wheel speed sensors. A compensation factor for each collected wheel speed signal is created 104. The method correlates 106 each compensation factor with a rotational position of the tire/wheel. Each compensation factor is individually modified 108 based on variations in calculations made from the information calculated according to the rotational position of the tire/wheel. Finally, the method calculates wheel speed and acceleration using the compensation factor applied according to the rotational position of the tire/wheel from which the wheel speed signal is collected 110.

Two simple example implementations are shown below with various uses of compensation factors. To assure robust, practical performance, some of the variations listed in the disclosure would likely need to be added to these methods but the details are not shown below. The methods below can be combined to have independent compensation factors for repeated and segmented sources of variation. The methods shown below modify the compensation factors based on variations in calculated wheel speed values. It should be noted that similar methods can be used to modify the compensation factors based on variations in calculated wheel acceleration values and one having ordinary skill in the art is capable of translating the methods shown below into methods that are based on variations in calculated wheel acceleration values.

A single compensation factor, C, may be determined. Each compensation factor, C, correlates to a rotational position of the wheel and is used to adjust for a repeated variation. For example, a typical repeated variation may be due to differences in how the magnetic field is modulated by the encoder or tone-ring for increasing and decreasing magnetic fields. Each compensation factor is correlated with a wheel speed event in such a way that a determination is made as to whether a wheel speed event is generated by an increasing or decreasing magnetic field.

Given the following variables:

$D_e$=Nominal distance traveled or rotational angle turned for each Wheel Speed Event $N_{rotation}$=Number of Wheel Speed Events (magnetic field changes) in the rotation of a wheel $N_{total}$=Total cumulative number of Wheel Speed Events $N_e$=Number of Wheel Speed Events (magnetic field changes) for the current wheel speed calculation $T_f$=Time of the first wheel speed event for the current wheel speed calculation $T_1$=Time of the last wheel speed event for the current wheel speed calculation $N_{total}$ has an initial value of 0 and C has an initial value of 0. As the wheel rotates, each value of the Wheel Speed ($V_w$) is calculated as follows:

```
N_total = N_total + N_e
   IF N_total > N_rotation THEN
      N_total = N_total - N_rotation
   ENDIF
   IF (N_e is Even) THEN        /* Equal number of magnetic field
                                   increases as decreases. */
      V_w = D_e * N_e / (T_1 - T_f)
   ELSE IF (N_total is Even) THEN  /* One more magnetic field
                                      change in one direction. */
      V_w = D_e * (N_e + C) / (T_1 - T_f)
   ELSE                         /* One more magnetic field change
                                   in opposite direction. */
      V_w = D_e * (N_e - C) / (T_1 - T_f)
   ENDIF
```

The compensation factor (C) is adjusted based on the difference between $V_w$ and $V_{w\_filt}$—a filtered value of $V_w$—as follows:

```
IF (N_e is Even) THEN           /* Equal number of magnetic field
                                   increases as decreases. */
   C = C
ELSE IF (N_total is Even) THEN  /* One more magnetic field
                                   change in one direction. */
   C = C + P_learn * (V_w_filt - V_w) *
       (T_1 - T_f)
ELSE                            /* One more magnetic field
                                   change in opposite direction. */
   C = C - P_learn * (V_w_filt - V_w) *
       (T_1 - T_f)
ENDIF
```

The learning factor ($P_{learn}$) is used to assure that the value of C changes slow enough that its value converges to a nearly constant value (Lyapunov stability).

In this embodiment, a single compensation factor is calculated. Situations where the use of a single compensation factor applies are limited. For example, the single compensation factor may be used in situations where half of a wheel speed event spacing on one side of a ring tone is prevailingly more than on the other side, a single compensation factor may be used. In another example, a systematic altering of the tooth/event spacing occurs such that every other event spacing is closer than the ones in between. There may be manufacturing reasons why either of these situations would occur, and a single compensation factor may be used. However, it is more likely that multiple compensation factors will be applied because each factor correlates to a rotational position of the wheel.

In another embodiment of the inventive subject matter, multiple compensation factors may be used to adjust for segmented variations. In this embodiment of the inventive subject matter, a unique compensation factor may be defined for each magnetic field change in the rotation of the wheel to adjust for variation that is due to each individual segment of rotation. Similar methods can be applied to compensate for variations that affect large or small segments. A wheel speed sensor installation has a predetermined number of teeth on a tone ring providing twice that predetermined number magnetic field changes per rotation of the wheel. For example, a typical wheel speed sensor installation has 50 teeth on a tone-ring, providing a total of 100 magnetic field changes per rotation of the wheel.

The wheel speed calculation and compensation factors can be calculated as follows given the following variables:

$D_e$=Nominal distance traveled or rotational angle turned for each Wheel Speed Event $N_{rotation}$=Number of Wheel Speed Events (magnetic field changes) in the rotation of a wheel $C_i$=Compensation factor for each Wheel Speed Event i, where i ranges from 0 to $N_{rotation}$-1

$N_e$=Number of Wheel Speed Events (magnetic field changes) for the current wheel speed calculation $T_f$=Time of the first wheel speed event for the current wheel speed calculation $T_1$=Time of the last wheel speed event for the current wheel speed calculation $N_e$=Number of Wheel Speed Events (magnetic field changes) for the current wheel speed calculation $I_{old}$ has an initial value of 0. As the wheel rotates, each value of the Wheel Speed ($V_w$) and the compensation factors ($C_i$) are calculated as shown below (where $V_{w\_filt}$ is a filtered value of $V_w$).

```
i = I_old
N_change = 0
D_total = 0
WHILE (N_change < N_e)
    D_total = D_total + D_e + C_i
    N_change = N_change + 1
    IF i < N_rotation -1 THEN
        i = i + 1
    ELSE
        i = 0
    ENDIF
END WHILE
V_w = D_total / (T_1 - T_f)
i = Iold
N_change = 0
WHILE (N_change < N_e)
    C_i = C_i * (1 + P_learn * V_w_filt / V_w )
    N_change = N_change + 1
    IF i < N_rotation -1 THEN
        i = i + 1
    ELSE
        i = 0
    ENDIF
END WHILE
I_old = I_old + N_e
```

The learning factor ($P_{learn}$) is used to assure that the values of $C_i$ change slowly enough that their values converge to nearly constant values (Lyapunov stability).

In another embodiment of the inventive subject matter, it is possible to limit modifications of compensation factors during conditions when the compensation factors may erroneously be influenced. For example, rough road, bad data, etc. such as during events when tire-wheel dynamics may be large, at high speed, when timer resolution effects increase noise. Another example may be during events when there are high loads changing the air-gap between the sensor and tone ring or encoder, potentially distorting relationships that are more generally maintained. When there are high loads on the vehicle, events measured on the wheel may be affected by deformation of the wheel and ring resulting in a difference in distance between the wheel and the sensor. A vehicle cornering very fast may result in high loads, or during a hard braking event.

Furthermore, when the vehicle is traveling in reverse, there is a need to modify the correlation of the compensation factors with rotational position of the tire-wheel during reverse travel. When traveling in reverse, events are occurring in reverse order. Therefore, when correlating the compensation factor with the position, the correlation should be reversed.

In yet another embodiment of the inventive subject matter, it is possible to limit modification of compensation factors during times when the compensation factors reach limits. In this embodiment, the step of modifying the compensation factors 108 includes setting a predetermined limit for each compensation factor, and limiting the modification of compensation factors when they meet or exceed their predetermined limit.

In still another embodiment of the inventive subject matter, it is possible to limit the magnitude of the compensation factors. For example, a severely broken or missing tooth will affect the number of events the inventive subject matter is correlating. Therefore, a limit within the logic may be used for setting fault conditions when the compensation factors reach limits. This will prevent compensation up to a predetermined limit and then a fault condition may be set to identify the correlation issue.

In still another embodiment of the inventive subject matter, it is possible to store the compensation factors between operating times of the vehicle. Factors learned over time that are stored may be affected by movement of the vehicle when the vehicle itself is powered off. For example, a movement of the steering wheel when the vehicle is powered off will affect the wheel position, but may not be recognized as occurring because the vehicle is powered off. Therefore, the inventive subject matter may make it possible to learn the correlation of stored compensation factors with the wheel rotational position when vehicle operation resumes.

In the foregoing specification, the invention has been described with reference to specific exemplary embodiments. Various modifications and changes may be made, however, without departing from the scope of the present invention as set forth in the claims. The specification and figures are illustrative, rather than restrictive, and modifications are intended to be included within the scope of the present invention. Accordingly, the scope of the invention should be determined by the claims and their legal equivalents rather than by merely the examples described.

For example, the steps recited in any method or process claims may be executed in any order and are not limited to the specific order presented in the claims. The equations may be implemented with a filter to minimize effects of signal noises. Additionally, the components and/or elements recited in any apparatus claims may be assembled or otherwise operationally configured in a variety of permutations and are accordingly not limited to the specific configuration recited in the claims.

Benefits, other advantages and solutions to problems have been described above with regard to particular embodiments; however, any benefit, advantage, solution to problem or any element that may cause any particular benefit, advantage or solution to occur or to become more pronounced are not to be construed as critical, required or essential features or components of any or all the claims.

The terms "comprise", "comprises", "comprising", "having", "including", "includes" or any variation thereof, are intended to reference a non-exclusive inclusion, such that a process, method, article, composition or apparatus that comprises a list of elements does not include only those elements recited, but may also include other elements not expressly listed or inherent to such process, method, article, composition or apparatus. Other combinations and/or modifications of the above-described structures, arrangements, applications, proportions, elements, materials or components used in the practice of the present invention, in addition to those not specifically recited, may be varied or otherwise particularly adapted to specific environments, manufacturing specifications, design parameters or other operating requirements without departing from the general principles of the same.

What is claimed is:

1. A method for compensating for wheel speed and acceleration calculation errors comprising the steps of:
   collecting a wheel speed signal;
   creating at least one compensation factor for the wheel speed signal;
   applying a learning factor for controlling a rate of change of each compensation factor such that the compensation factors reach Lyapunov stability;
   correlating each compensation factor with a rotational position of the wheel;
   modifying the learning factor using a ratio of the filtered wheel speed calculation and the wheel speed calculation;

modifying each compensation factor individually based on variations in calculations made from the information collected according to the rotational position of the wheel; and calculating wheel speed and acceleration using the at least one compensation factor applied according to the rotational position of the wheel from which the wheel speed signal is collected.

2. The method as claimed in claim 1 wherein the step of modifying each compensation factor further comprises the step of limiting modification of each compensation factor during periods when each compensation factor may be erroneously influenced.

3. The method as claimed in claim 2 wherein the periods when each compensation factor may be erroneously influenced further comprise a wheel speed being affected by a rough road surface.

4. The method as claimed in claim 2 wherein the periods when each compensation factor may be erroneously influenced further comprise a wheel speed being affected by vehicle speed exceeding a predetermined threshold value.

5. The method as claimed in claim 2 wherein the periods when each compensation factor may be erroneously influenced further comprise a wheel speed being affected by large wheel dynamics.

6. The method as claimed in claim 2 wherein the periods when each compensation factor may be erroneously influenced further comprise a wheel speed being affected by sensor distortion events.

7. The method as claimed in claim 1 wherein the step of modifying each compensation factor further comprises the step of limiting a magnitude of each compensation factor.

8. The method as claimed in claim 1 wherein the step of correlating each compensation factor with a rotational position of the wheel further comprises the step of reversing the correlation of each compensation factor for a reversed rotation position of the wheel.

9. A method for compensating for wheel speed and acceleration calculation errors comprising the steps of:
    collecting a wheel speed signal;
    creating a compensation factor for the wheel speed signal;
    calculating a wheel speed using the rotational position of the wheel from which the wheel speed signal is collected;
    filtering the calculated wheel speed;
    modifying the compensation factor based on the calculated wheel speed;
    applying a learning factor to control a rate of change of the compensation factor such that the compensation factor reaches to Lvapunov stability,
    modifying the learning factor using a difference between the filtered calculated wheel speed and the calculated wheel speed; and
    adding the modified learning factor to the compensation factor when a total number of cumulative wheel speed events is an even number.

10. The method as claimed in claim 9 wherein the step of modifying the compensation factor further comprises subtracting the modified learning factor from the compensation factor when a total number of cumulative wheel speed events is greater than zero and is not an even number.

11. The method as claimed in claim 9 wherein the step of modifying the compensation factor further comprises the steps of:
    adding the modified learning factor to the compensation factor for a total cumulative number of wheel speed events that is an even number; and
    subtracting the modified learning factor from the compensation factor for any other total cumulative number of wheel speed events.

12. A method for compensating for wheel speed and acceleration calculation errors comprising the steps of:
    collecting a wheel speed signal;
    creating a plurality of compensation factors for the wheel speed signal;
    correlating each compensation factor with a rotational position of the wheel;
    calculating wheel speed and acceleration using each compensation factor in the plurality of compensation factors applied according to the respective rotational position of the wheel from which the wheel speed signal is collected;
    filtering the calculated wheel speed;
    modifying each compensation factor individually based on variations in calculations made from the information collected according to the rotational position of the wheel;
    applying a learning factor to control a rate of change of each compensation factor such that the compensation factors reach Lvapunov stability; and
    modifying the learning factor using a ratio of the filtered calculated wheel speed and the calculated wheel speed.

* * * * *